G. L. HARVEY.
EXPOSURE METER.
APPLICATION FILED JAN. 12, 1918.

1,292,600.

Patented Jan. 28, 1919.
2 SHEETS—SHEET 1.

Witness:
Geo. C. Davison

Inventor
George L. Harvey
By Chas. F. Murray
Atty.

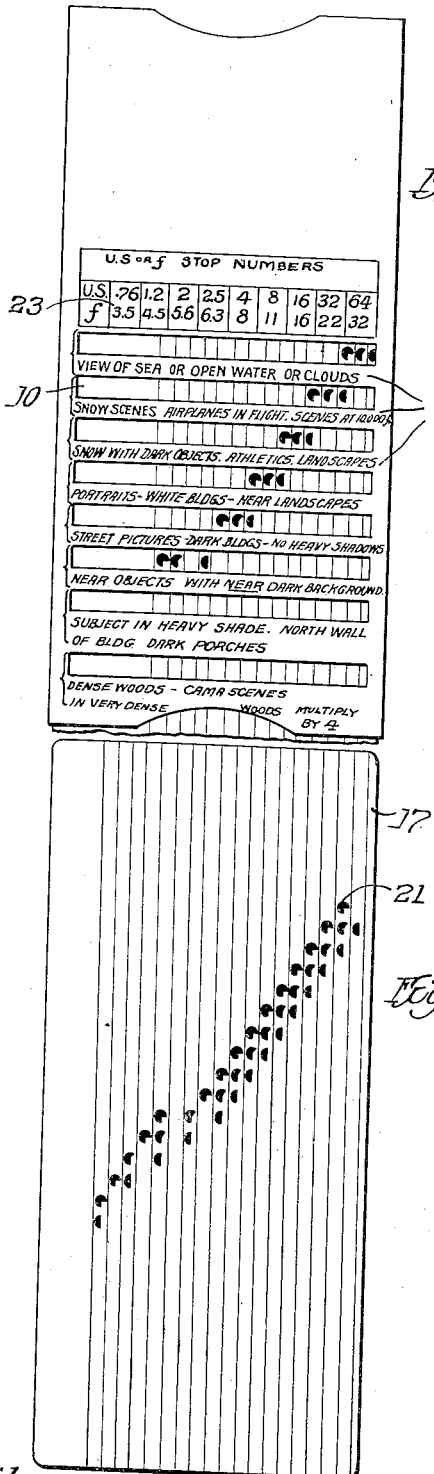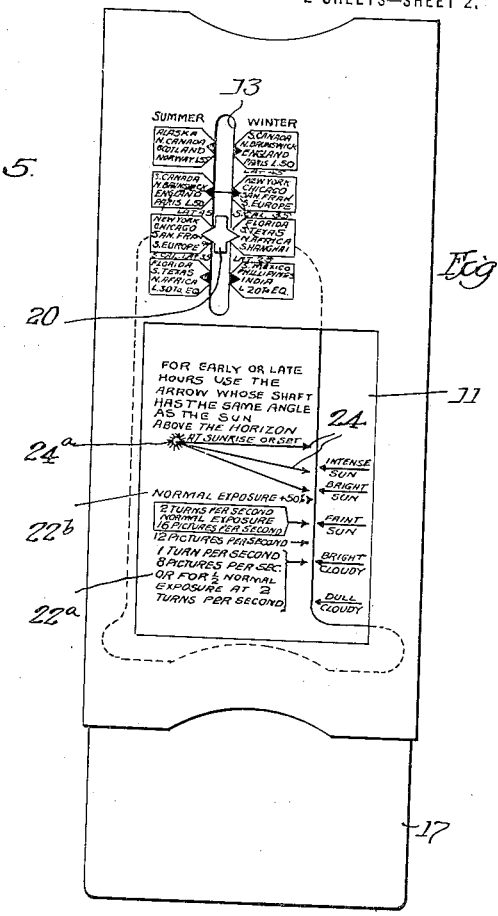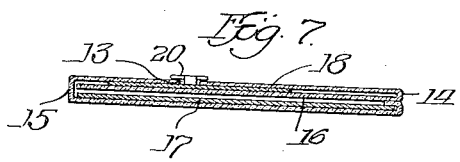

UNITED STATES PATENT OFFICE.

GEORGE L. HARVEY, OF CHICAGO, ILLINOIS.

EXPOSURE-METER.

1,292,600.  Specification of Letters Patent.  Patented Jan. 28, 1919.

Application filed January 12, 1918. Serial No. 211,498.

*To all whom it may concern:*

Be it known that I, GEORGE L. HARVEY, a citizen of the United States, and resident of Chicago, in the county of Cook and State of Illinois, have invented certain new and useful Improvements in Exposure-Meters, of which the following is a specification.

My invention relates to exposure meters and particularly to an improvement on the construction disclosed in my prior Patent No. 1,186,093 of June 6, 1916.

The present device is intended for use in connection with motion picture cameras in the operation of which the difficulties to be overcome are not the same as in cameras of the common type. For instance, the different speeds or length of exposure times are secured by changing the area of the shutter and by varying the cranking speed.

A cranking speed of two turns per second is normally employed which results in sixteen pictures per second and this is not varied except in unusual instances. In some cases, however, three-quarter (1½ turns per second) and half (1 turn per second) speeds are required. Further variation in exposure times is secured by changing the shutter area from one-half to three-fourth size. At normal cranking speed with a one-half size shutter, the exposure of each picture will be 1/32nd of a second; for three-eighths size shutter it will be 1/48th second and for one-quarter size shutter the exposures will be 1/64th second.

It will therefore be apparent that for different cranking speeds and variations in shutter size the exposure times are determined only by computations. This makes somewhat difficult the use of a meter such as shown in my patent referred to. I have therefore correlated on one side of the device the light conditions and speed of cranking and on the other side, the class of subject, size of stop and size of shutter. The user is thus enabled after the movement of one part to see at a glance the size of stop and shutter to be employed in photographing any subject. By this means no computations are necessary.

As a further improvement I have added certain designations by means of which the device may be adjusted to light conditions in the morning or late in the afternoon, the angularity of the sun's rays to a vertical line being taken as the basis for adjustment.

Certain producers and operators prefer for satisfactory reasons to under-expose all pictures in order to produce thin negatives, a certain strength of developer being employed to secure the desired results, while others claim to secure equally good results by overexposing and utilizing a weak developer. Both these conditions are provided for in connection with the means for correlating the cranking speed and light conditions.

It will be noted that in the present device no figures relating to the length of time of exposure are employed. The size of the shutter is used as the means for conveying the necessary information to the operator. In other words, after the device has been set to correlate the light conditions and the speed of cranking, there appears on the reverse side of the device under each designation of size of stops the proper size of shutter to employ for any of the varied subjects to be photographed. The operator has only to select the size of stop which he prefers to employ and a proper size shutter is visually shown in the window opening adjacent to the designation of the subject to be photographed.

The invention will be more readily understood by reference to the accompanying drawings, wherein, Figure 1 is a view showing the chart in its original form before having been bent into the form of an envelop;

Fig. 3 is a view of the opposite side of the same slide;

Fig. 5 is a view of one side of the assembled device;

Fig. 6 is a view of the opposite side thereof, and,

Fig. 7 is a cross sectional view therethrough.

Figure 1:
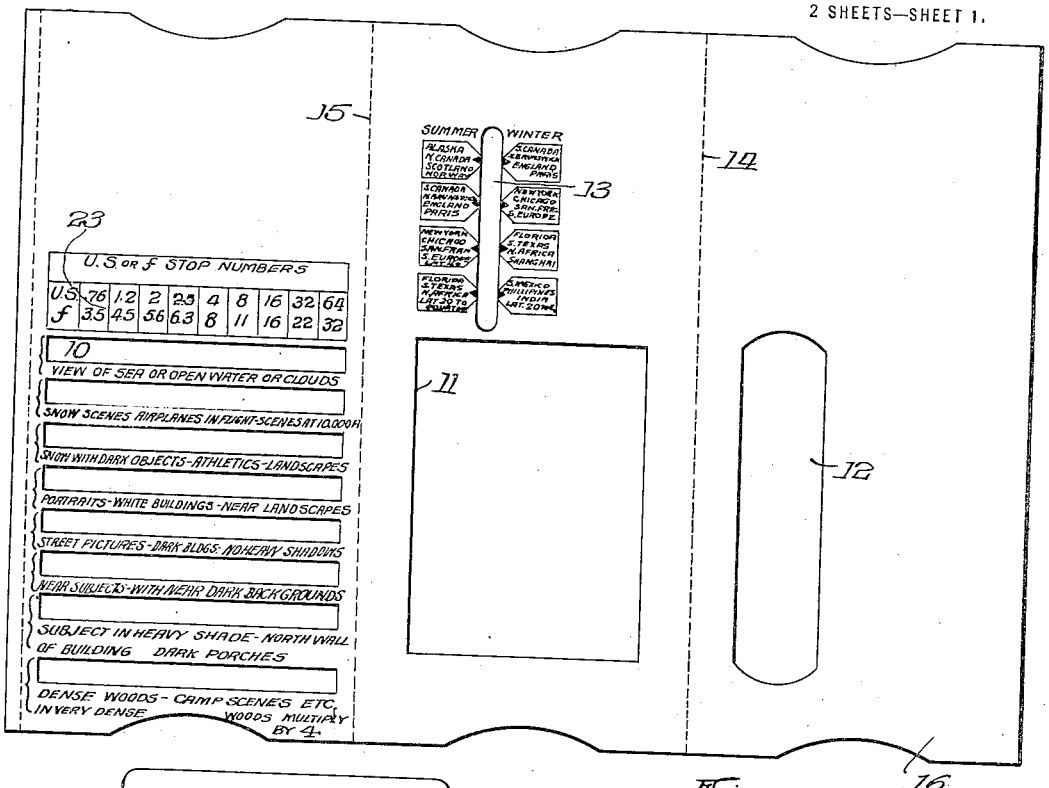
Figure 2:
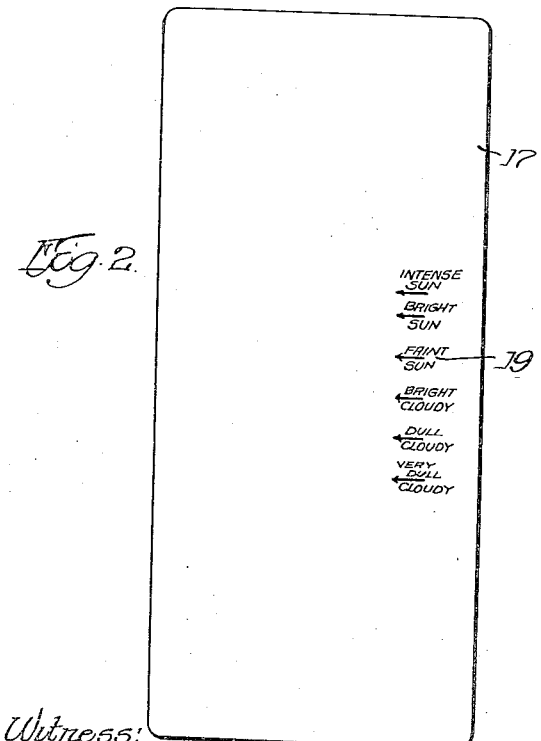
Fig. 2 is a view of one side of a slide which is employed.

The blank shown in Fig. 1 is intended to be formed of celluloid or similar material and is provided with the window openings 10, which are in the form of narrow slits, the larger window opening 11, and the supplementary window opening 12. These spaces, while referred to as window openings, are actually closed by the material of the blank, but this part of the material is transparent the remainder of the blank being opaque. The space 13, however, is an actually open slot in the blank adapted to accommodate a pin or clip on the smaller slide. The blank is doubled on itself on the dotted lines 14, 15, of Fig. 1, thus forming an envelop, the part 16, of the blank serving as a dividing wall, or a means for dividing the envelop into two parts. Thus a space is provided for the accommodation of the two slides 17, 18, the designations as to the condition of light being visible through the windows 11, 12.

As best shown in Fig. 6, the slide 18, is provided with an integral clip or button 20, the edges of which constitute pointers and which occupies the opening 13. The designations as to cranking speeds, etc., appearing on the slide 18, are visible through the window 11, and as the slide is adjusted to correspond to different geographical locations it will be seen that the slide is moved longitudinally of the envelop within which it is mounted. This slide is rather tightly fitted within the envelop as the adjustments thereof will be made at rather long intervals.

Figure 4:
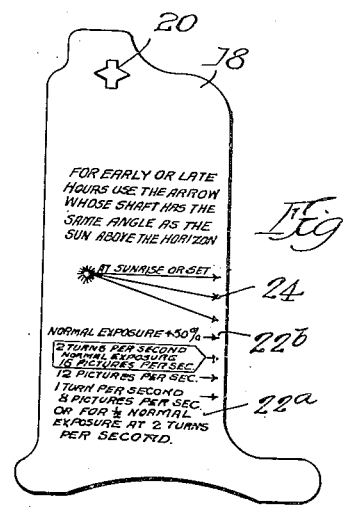
Fig. 4 is a view of a second smaller slide which is adapted to be adjusted to geographical location.

The other slide 17, is mounted in the other compartment of the envelop, this slide having on one side the designations 19, as to light conditions, these being visible through the two window openings 11, 12, as shown in Fig. 6. On the opposite side the slide 17, contains symbols 21, which are in the form of representations of the size of shutter employed in motion picture cameras. It will be understood that the shutter employed is generally circular in form and is rotated across the light opening. The size of the notch or cut-out portion of the circular disk determines the length of exposure for each rotation of the shutter. Therefore, assuming that one-quarter of the disk is cut away and that a cranking speed of two turns per second is employed, sixteen exposures per second will be made and the length of each exposure will be 1/64th second. It will be seen therefore that the length of the exposure is determined by two factors; first, the cranking speed, and, second, by the size of the notch in the rotating ditch. These are located in the proper position after careful experiments and appear in the windows 10, which are adjacent to the designations 22, of the subjects to be photographed. Located above the windows 10, are the designations 23, of the size of stops commonly employed. It has been found that the difference between the sizes of shutter to be employed requires stop openings which fall between the usual numbers and therefore the stop size which is halfway between that designated by the usual numbers will be employed. That is to say, the use of a certain sized shutter opening, such as depicted by the symbols 21, in photographing the subjects 22, requires a stop opening, as indicated by the numeral 23, which is half way between the sizes normally designated on the machine. For instance, in the example shown in Fig. 5, if a view such as designated in the fifth window opening is to be taken with a half size shutter, the U. S. stop opening will fall half-way between the figures 4 and 8; thus the U. S. stop opening would be 6, if such an opening were commonly designated.

In addition to the designations as to cranking speeds appearing on the slide 18, I have provided for designations $22^a$, $22^b$ for under and over exposed negatives respectively, it being understood that these apply only when normal cranking speed is used. As heretofore stated, some operators prefer to under-expose all pictures in order to produce thin negatives, while others desire to over-expose their films and utilize a weaker developer. By setting the slide 17, so that the arrows 19, indicate light conditions, correlated with the arrows or designations $22^a$, $22^b$, the pictures will all be normally under or over exposed, as desired. I have also provided designations such as the arrows 24, adapted for use early in the forenoon or late in the afternoon, the slide being set to the arrow the shaft of which has the same angle as that of the sun above the horizon.

In other words, in order to utilize this feature, the device as a whole is held in a vertical position with the shaft of the arrows 24, pointing directly to the sun, which is indicated at $24^a$, and the slide 17, is set with the light-condition arrows 19, registering with the arrow 24, which comes closest to the angle of the sun at that time.

In operation the slide 18 is adjusted by means of the clip 20, until the pointer is opposite the geographical designation of the point at which the photographs are to be taken, summer and winter adjustments being observed. The slide 17 is then moved until the designations 19, of the light conditions are correlated with the particular cranking speed or other condition which appears on the face of the chart. The device is then reversed and there will appear, as best shown in Fig. 5, in the window openings 10, a representation of the proper size shutter to employ for any of the different subjects and for all the different stops. There is no opportunity for error as no figures are employed and no computations are necessary. For instance, the device is set for use at Chicago and similar latitudes, the time being in the middle portion of the day, the light conditions being such as indicate a faint sun and a normal cranking speed being employed. It will therefore be seen that the proper shutter sizes to be employed for any of the different subjects are visually displayed in the windows 10, on the opposite side of the device. All possibility of error is eliminated and the meter is so arranged that after having been adjusted to the correct geographical location, the single remaining adjustment may be made in a moment and without the use of more than ordinary care and intelligence.

I claim:

1. In an exposure meter, the combination of a chart having thereon designations of cranking speeds, a member movable relative to the chart, said member having on one side designations as to light conditions adapted to be correlated with the cranking speeds, said chart having on its opposite side designations as to stop numbers and said movable member having on its opposite side symbols indicating size of shutter, the symbols and stop numbers being adapted to be correlated by adjustment of the movable member to correspond to light conditions, substantially as described.

2. An exposure meter, comprising in combination, a chart having thereon symbols indicating geographical location and size of stops, a movable member having symbols indicating cranking speed, said member being adapted to be correlated with the geographical location symbols, and a second movable member having symbols indicating light conditions and sizes of exposure shutter, the symbols indicating light conditions to be correlated with the symbols indicating speed of cranking, the first mentioned movable member and the symbols indicating size of shutter to be correlated with the stop symbols, substantially as described.

3. In an exposure meter, the combination of an envelop having windows in its sides and having on one side adjacent to a window certain symbols indicating geographical location and on the other side symbols indicating size of stops, a slide movable within the envelop said slide having thereon symbols indicating speed of cranking, said slide being adapted to be correlated with the geographical location symbols, and a second slide having on one side designations as to light conditions adapted to be correlated with the symbols as to speed of cranking and on the other side symbols showing size of shutter, said last mentioned symbols being adapted to be correlated with the symbols as to stops, substantially as described.

4. In an exposure meter, the combination of an envelop having in one wall thereof a plurality of windows and adjacent to said windows designations of varied subjects to be photographed, stop numbers arranged transversely of the envelop and in proximity to said windows, and a movable slide containing on one side symbols indicating sizes of exposure shutters and on the other side designations as to light conditions, and means for correlating the designations on said slide as to light conditions with speeds of cranking whereby when so adjusted the slide shall display correct size of exposure shutter for different subjects and different sizes of stop openings, substantially as described.

5. An exposure meter comprising in combination, a chart having thereon symbols indicating geographical location and size of stops, a movable member having angular lines adapted to indicate the angularity of the sun's rays to the horizon, said member being adapted to be correlated with the geographical location symbols, and a second movable member having symbols indicating light conditions and exposure times, the second number being adapted to be moved to correlate the symbols indicating light conditions with the said angular lines thereby correlating the symbols as to exposure times with the symbols indicating size of stops, substantially as described.

6. An exposure meter, comprising in combination, a chart having thereon symbols indicating geographical location and size of stops, a slide having angular lines indicating the angularity of the sun's rays above the horizon and also having symbols indicating speed of cranking, said slide being adapted to be correlated with the symbols as to geographical location, and a second slide having on one side symbols indicating light conditions and on the other side symbols indicating size of shutter, the light condition symbols being adapted to be correlated with the angular lines and with the symbols indicating speed of cranking, the symbols as to shutter sizes being adapted to be correlated with the symbols as to size of stops, substantially as described.

7. An exposure meter, comprising in combination, a chart having a member containing angular lines indicating position of the sun and designations for the normal, under, or over exposures at normal cranking speeds, a slide having on one side designations as to light conditions adapted to be correlated with the designations on said member and having on the other side pictorial representations of shutters of different sizes, said representations being correlated with designations as to subjects and size of stops by adjustment of the slide as to light conditions, substantially as described.

Signed at Chicago, Ill., this 8th day of January, 1918.

GEORGE L. HARVEY.

Witness:
T. D. BUTLER.